No. 862,036. PATENTED JULY 30, 1907.
P. F. WARREN.
HAY PRESS.
APPLICATION FILED JULY 31, 1906. RENEWED MAY 28, 1907.
2 SHEETS—SHEET 1.
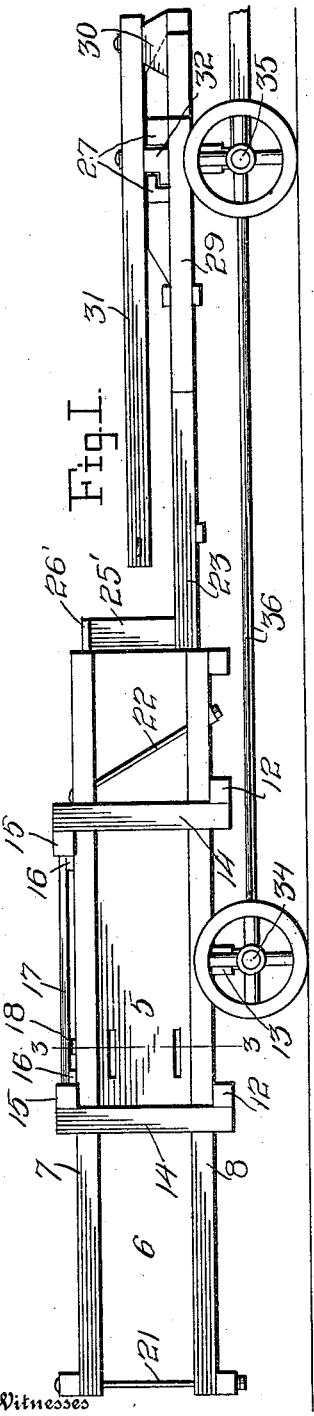
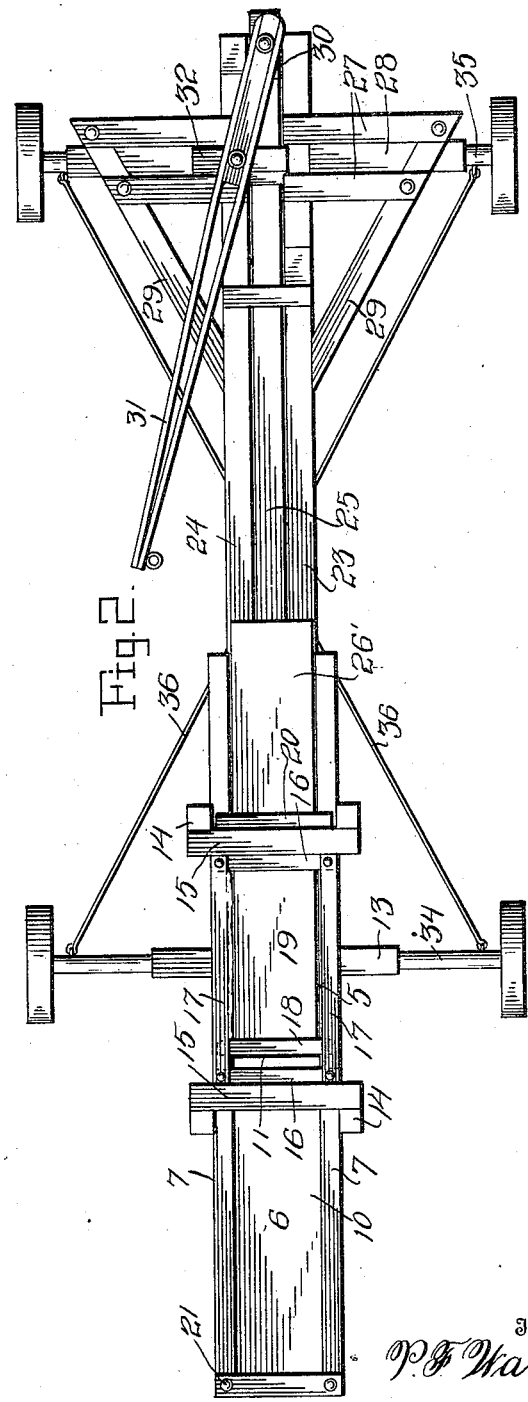
Witnesses

No. 862,036. PATENTED JULY 30, 1907.
P. F. WARREN.
HAY PRESS.
APPLICATION FILED JULY 31, 1906. RENEWED MAY 28, 1907.
2 SHEETS—SHEET 2.
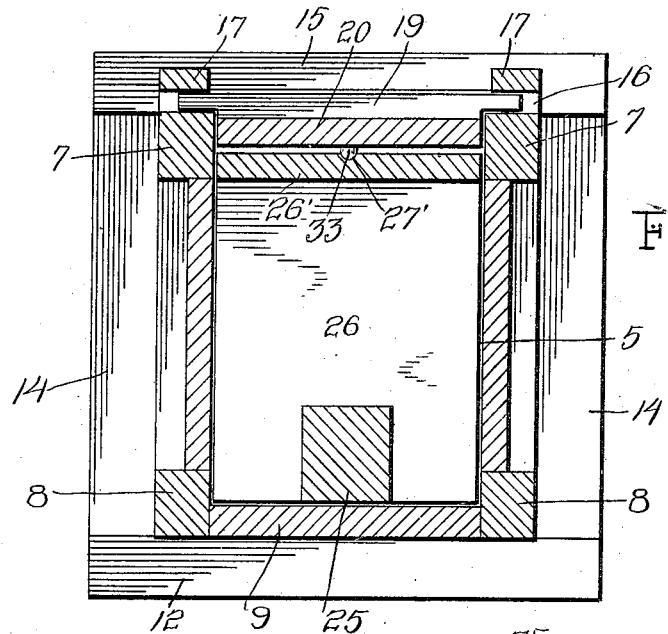
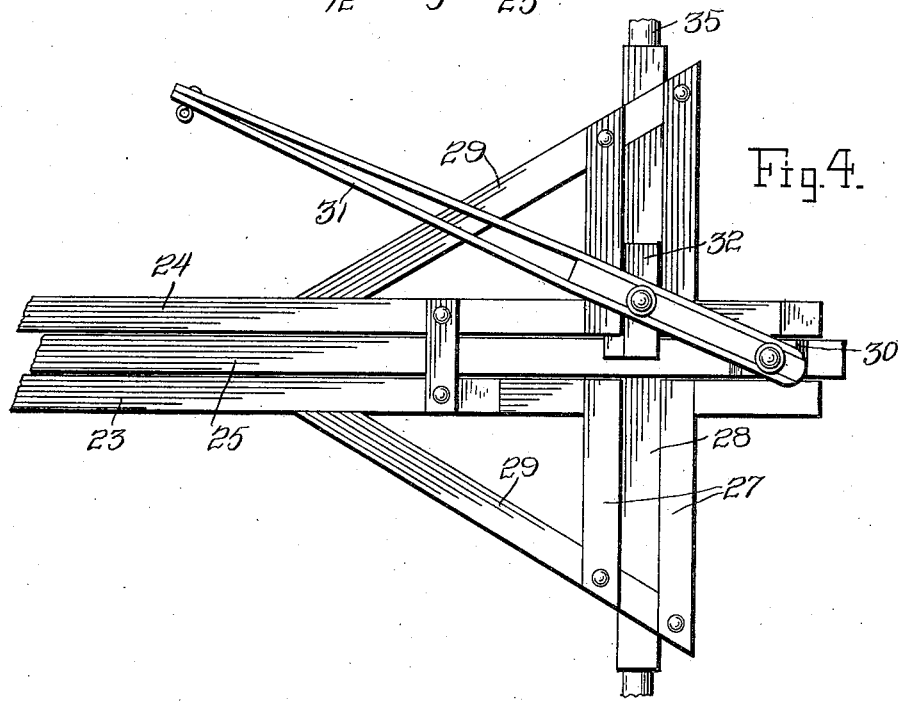

UNITED STATES PATENT OFFICE.

PHILANDER F. WARREN, OF MAXWELL, TENNESSEE, ASSIGNOR OF ONE-HALF TO M. C. ATKINSON, OF MAXWELL, TENNESSEE.

HAY-PRESS.

No. 862,036.  Specification of Letters Patent.  Patented July 30, 1907.

Application filed July 31, 1906, Serial No. 328,588. Renewed May 28, 1907. Serial No. 376,208.

*To all whom it may concern:*

Be it known that I, PHILANDER F. WARREN, a citizen of the United States, residing at Maxwell, in the county of Franklin, State of Tennessee, have invented certain new and useful Improvements in Hay-Presses; and I do hereby declare the following to be a full, clear, and exact description of the invention, such as will enable others skilled in the art to which it appertains to make and use the same.

This invention relates to presses and more particularly to hay presses and has for its object to provide a press of this kind which will be strong and durable, which will include a novel follower - reciprocating mechanism and which will be simple in arrangement.

Another object is to provide a press adapted for easy transportation from place to place.

Other objects and advantages will be apparent from the following description, and it is to be understood that I do not desire to be limited to the exact details of construction shown and described, for obvious modifications will occur to a person skilled in the art.

In the drawings forming a portion of this specification and in which like numerals of reference indicate similar parts in the several views, Figure 1 is an elevational view of the present press. Fig. 2 is a top plan view. Fig. 3 is a transverse section on line 3—3 of Fig. 1, the sliding door being in closed position and the follower being projected into the baling chamber, the latch being in position for movement of the door with the follower. Fig. 4 is a plan view of the operating mechanism, showing the slide at one side of the follower bar.

Referring now to the drawings, the present invention comprises a baling chamber 5 and a rearwardly extending bale chute 6. Upper and lower pairs of beams 7 and 8 are provided, and secured between the lower beams 8, there is a board 9 which forms the bottom of the baling chamber and the bottom of the chute 6, and a top 10 is secured between the upper beams 7 at the rearward portions thereof, and terminates above the baling chute 5.

Cross sills 12 receive the beams 8 thereupon and lie in spaced relation to each other and a sill 13 is secured to the under faces of the beams, between the sills 12. Uprights 14 are secured to the ends of the sills 12 and lie in pairs at opposite sides of the baling chamber, and secured to the upper ends of these uprights, there are cross members 15 which rest upon the beams 7. Secured upon the beams 7 between the members 15, there are cross pieces 16 which lie in spaced relation, and receive thereupon the ends of longitudinal strips 17, lying one above each beam 7, and the top 10 terminates just forwardly of the rearward cross piece 16.

A transverse slide 18 has its ends disposed upon the beams 7 and beneath the strips 17, and secured to the rearward ends of the sliding door 19 provided with a second slide 20 at its forward end and resting at its end upon the beams 7, forwardly of the foremost cross member 15. The door 19 lies between the beams 7 and is movable into and out of position to close the space 11 between the top 10 and the forward cross member 15. The beams 7 and strips 17 thus form guides for the slide 18, and the movement of this slide is limited by the forward cross piece 16 in one direction and by the top 10 in the opposite direction.

Upright rods 21 connect the rearward ends of the beams 7 with the beams 8 and downwardly and forwardly slanted diagonal brace rods 22 are engaged in the forward portions of these beams.

Spaced guide beams 23 and 24 respectively are secured upon the forward portion of the bottom 9 and extends forwardly from the baling chamber, and slidably engaged between these guide beams, there is a follower rod 25 having a follower 26 at its rearward end which lies within the baling chamber, and secured to this follower at its rearward end, there is a top board 26′ which extends forwardly, and which is supported by an upright 25′ secured to the follower rod 25.

Transverse parallel guides 27 are secured upon the guide beams 23 and 24 at the forward ends thereof, and lie in spaced relation, and between the space beneath these guides 27, there is secured a bottom member 28, this bottom member and the guides being braced by diagonal members 29 secured to their outer ends and to the guide beams 23 and 24. Each guide 27 consists of two sections disposed in alinement and spaced at their inner ends above the follower rod 25, for the passage of a block 30 carried by the forward end of this follower rod therebetween, and pivoted upon this block, there is a horizontally extending operating lever 31 which is also pivoted to a slide 32 engaged between the guides 27 and resting upon the bottom members 28, the pivot point of the lever with the slide 32 lying between the pivoted and free ends of the lever. It will thus be seen that when the lever is moved in a horizontal plane upon its pivotal connection with the block 30, its fulcrum will be shifted from side to side of the follower rod 25, and that the power applied to the free end of the lever will be greatly increased when it reaches the follower rod.

The top board 26′ has a concavity 27′ in its upper surface adjacent to its rearward end and the door 19 has a depending projection 33 adapted to enter the concavity, the door having sufficient vertical movement to bring its projection into and out of the concavity. It will thus be seen that when the door is closed, and the follower moved to compress a bale, it will be brought into position for engagement of the projection 33 in the concavity 27' when retraction of the follower will carry the door with it into open position, the engagement of the slide 18 with the forward cross piece 16 stopping the movement of the door before the follower has reached the forward limit of its movement, so that the projection is disengaged from the concavity and the door is thus free to be moved into closed position by the hand after the baling chamber has been filled with hay, through the opening 11.

A wheeled axle 34 is pivoted to the cross sill 13, and a similar axle 35 is pivoted beneath the bottom member 28 and these axles are connected by cross rods 36, so that the wheels of the axle 34 are caused to track with the wheels of the axle 35 when the machine is turned.

What is claimed is:

1. In a press, the combination with a baling chamber, of a sliding door for the chamber, a follower slidable within the baling chamber, a member connected with the follower and having a depression therein, a projection carried by the door for engagement in the depression to move the door with the follower, and means for limiting the movement of the door in one direction, said means being located to stop the movement of the door before the follower has reached the limit of its movement in the same direction.

2. A baling press comprising a baling chamber and a bale chute, said chamber and chute including upper and lower pairs of beams, a door for the top of the baling chute, slides carried by the door and resting upon the beams, guide strips located above one of the slides, a cross piece carried by the upper beams and located to receive one of the slides thereagainst, to limit the movement of the door into open position, a follower slidably engaged in the baling chamber, a top board carried by the follower and having a depression therein, a projection carried by the door for engagement in the depression to move the door with the follower, said door being movable vertically to bring its projection into and out of the depression and lying in position when closed, to engage its projection in the depression when the follower is at the limit of its movement into the baling chamber.

In testimony whereof, I affix my signature, in presence of two witnesses.

PHILANDER F. WARREN.

Witnesses:
J. R. ONEAL,
A. C. DAVIS.